United States Patent [19]

Cho et al.

[11] Patent Number: 4,839,146

[45] Date of Patent: Jun. 13, 1989

[54] CATALYST FOR SIMULTANEOUS NO DECOMPOSITION AND CO OXIDATION UNDER CYCLED OPERATING CONDITIONS

[75] Inventors: Byong K. Cho, Rochester Hills; Christopher J. Stock, Southfield, both of Mich.

[73] Assignee: General Motors Corporation, Detroit, Mich.

[21] Appl. No.: 38,717

[22] Filed: Apr. 15, 1987

[51] Int. Cl.$^4$ ............................................. B01D 53/36
[52] U.S. Cl. ................................ 423/213.5; 502/303; 502/304
[58] Field of Search ..................... 423/213.5; 502/301, 502/303, 302

[56] References Cited

U.S. PATENT DOCUMENTS

| | | | |
|---|---|---|---|
| 2,978,360 | 4/1961 | Bradstreet et al. | 502/303 |
| 3,892,836 | 7/1975 | Compton et al. | 502/304 |
| 3,903,020 | 9/1975 | Sergeys et al. | 423/213.5 |
| 4,189,404 | 2/1980 | Keith et al. | 423/213.5 |
| 4,206,087 | 6/1980 | Keith et al. | 423/213.5 |
| 4,273,945 | 6/1981 | Heilen et al. | 502/302 |
| 4,331,565 | 5/1982 | Schaefer et al. | 423/213.5 |
| 4,587,231 | 5/1986 | Sawamura et al. | 502/304 |
| 4,621,071 | 11/1986 | Blanchard et al. | 502/302 |
| 4,663,137 | 5/1987 | Chane-Ching et al. | 423/263 |

FOREIGN PATENT DOCUMENTS

| | | | |
|---|---|---|---|
| 1142502 | 3/1983 | Canada . | |
| 145584 | 6/1985 | European Pat. Off. | 423/213.5 |
| 201670 | 11/1986 | European Pat. Off. | 502/304 |
| 203525 | 12/1986 | European Pat. Off. | 502/304 |
| 3010950 | 10/1981 | Fed. Rep. of Germany | 502/304 |
| 33232 | 2/1986 | Japan | 502/303 |
| 257239 | 11/1986 | Japan | 502/303 |
| 2090156 | 7/1982 | United Kingdom | 502/303 |
| 2122912 | 1/1984 | United Kingdom . | |
| 2141634 | 5/1984 | United Kingdom . | |

*Primary Examiner*—John Doll
*Assistant Examiner*—Jeffrey E. Russel
*Attorney, Agent, or Firm*—George A. Grove

[57] ABSTRACT

This invention relates to an automotive exhaust gas treatment catalyst composed of one or more noble metals dispersed on $CeO_2$-$RE_2O_3$ carrier particles. The ceria-rare earth oxide carrier for the noble metal facilitates the simultaneous oxidation of CO and decomposition of NO. The catalyst is particularly useful when the air-fuel mixture to the automobile engine is continually cycled between fuel rich and fuel lean of stoichiometric proportions.

7 Claims, No Drawings

CATALYST FOR SIMULTANEOUS NO DECOMPOSITION AND CO OXIDATION UNDER CYCLED OPERATING CONDITIONS

This invention relates to a catalyst for treating automobile exhaust gases to both oxidize carbon monoxide to carbon dioxide and chemically reduce or decompose nitrogen oxides to nitrogen. More specifically, this invention relates to an automotive exhaust gas treatment catalyst composed of one or more noble metals dispersed on $CeO_2$-$RE_2O_3$ carrier particles. The ceria-rare earth oxide combination carrier is particularly effective for promoting the simultaneous oxidation of CO and decomposition of NO.

BACKGROUND OF THE INVENTION

In order to reduce the amount of unburned hydrocarbons, carbon monoxide and nitrogen oxides (generally $NO_x$, principally NO and $NO_2$) in automotive exhaust gas to acceptable levels, special exhaust treatment catalysts and internal combustion engine operating practices have been developed. The successful conversion of the exhaust gas constituents is complicated by the requirement of simultaneously and rapidly oxidizing carbon monoxide to innocuous carbon dioxide and reducing NO to nitrogen. In general, of course, the oxidation reaction is favored by an abundance of oxygen, whereas the reduction reaction is inhibited by it. It has been found that when the proportions of air and gasoline are balanced close to their stoichiometric ratio, the simultaneous oxidation of CO and unburned hydrocarbons and the decomposition of NO can be accomplished to an acceptable degree. Catalysts called three-way catalysts have been devised for these operating conditions. In general, such catalysts comprise a dispersion of very small particles of platinum and rhodium on a carrier of high surface area particulate alumina.

These noble metals are scarce and expensive. They occur together in ores. Unfortunately, the present three-way catalysts require rhodium in an amount that exceeds its natural proportion in the noble metal bearing ores. It is, therefore, desirable and an object of this invention to devise and provide a catalyst that requires lower noble metal content in general and less rhodium in particular. It is, of course, necessary to also maintain or improve the efficiency of the automotive exhaust gas treatment.

As stated above, it is a current practice to operate automotive engines at approximately the stoichiometric air-fuel ratio. Because of varying gasoline compositions and rapidly changing engine operating parameters, it is not practical to operate the engine air-fuel ratio precisely at the stoichiometric proportion. Instead, it is the practice to continually and frequently cycle the air-fuel ratio of the mixture burned in the cylinders of the engine from just fuel rich of stoichiometric to just fuel lean of stoichiometric.

Such cyclic variation of air-fuel ratio is made possible by an oxygen sensor located in the exhaust manifold which detects whether the engine is then operating rich or lean of the stoichiometric ratio. The exhaust gas contains a very low amount of oxygen when the engine is running fuel rich and a much higher concentration of oxygen when the engine is then operating fuel lean. Continued signals from the oxygen sensor are processed by the engine computer control system to vary the fuel input to the engine such that it cycles between rich and lean virtually every second. Such rapid cycling of the air-fuel ratio produces an exhaust gas that over relatively short time increments averages stoichiometric air-fuel engine operation. The catalyst responds to such cycling of the air-fuel ratio. Therefore, it is desirable to have a catalyst which would permit more latitude in engine operating conditions and less frequent cycling of the fuel control and supply system. It is an object of this invention to provide such a catalyst.

BRIEF SUMMARY OF THE INVENTION

We have found that the catalytic activity of noble metals for the simultaneous oxidation of carbon monoxide and decomposition of nitrogen oxide is improved under cyclic operating conditions if ceria ($CeO_2$) is substituted for alumina as the noble metal carrier. Furthermore, such catalyst activity is further improved to a remarkable degree when a chemically reacted ceria-(rare earth metal)$_2O_3$ is employed as the particulate carrier for the noble metal.

Ceria-rare earth oxide solid solutions where ceria makes up 80 to 95 molar percent of the total are suitable for the practice of our invention. Preferably, however, the rare earth oxide ($RE_2O_3$) constitutes about 10 to 15 molar percent of the ceria-based carrier. Our catalyst carrier is suitably prepared by mixing fine particles of ceria and of a rare earth metal (trivalent) oxide, preferably gadolinia ($Gd_2O_3$), and heating the mixture in air at about 1400° C. to form a solid solution of the oxides. Such chemically reacted mixture of the tetravalent cerium oxide and trivalent gadolinium oxide produces a resultant crystal structure capable of temporarily absorbing additional oxygen. This carrier material is far superior to alumina ($Al_2O_3$) and significantly superior to ceria alone as a carrier for noble metals to catalytically promote the simultaneous oxidation of carbon monoxide and reduction of nitric oxide. Our carrier would typically be employed in the form of pellets for pellet-type catalysts or in the form of a wash coat for monolithic catalysts.

We perceive that such increased activity of our mixed oxide catalyst carrier results from its ability to temporarily store oxygen atoms that otherwise would be adsorbed on the active catalyst sites during further NO reduction. We surmise from our experimental work that the activity of traditional alumina-supported noble metal catalysts for NO decomposition is poisoned by the presence of oxygen adsorbed on the catalytic surfaces. Such adsorbed surface oxygen poisons or interferes with the activity of the catalyst during NO reduction otherwise promoted during the fuel rich half of the engine cycle. Our improved mixed oxide carrier better stores oxygen away from active catalytic sites of noble metals and thus promotes NO reduction.

Our mixed oxide carriers are converted into useful automotive exhaust treatment catalysts by dispersing one or more noble metals on the surface of the particles by suitable known techniques. For example, a solution of a compound of a noble metal such as rhodium or of a mixture of noble metals such as platinum and rhodium may be deposited onto the carrier particles. The carrier particles, of course, may be finely divided material or they may be in the form of pellets. After the particles have been soaked with the solution, they are calcined at a suitably elevated temperature to convert the noble metal compounds to finely dispersed particles of catalytic metal.

Other objects and advantages of our invention will be better understood and appreciated from a detailed description thereof which follows.

DETAILED DESCRIPTION

Under current federal automotive exhaust emission standards, it is necessary to reduce the levels of each of the unburned hydrocarbons, carbon monoxide and nitrogen oxides to quite low levels. In order to meet these emission standards, automobile manufacturers have had to use rhodium in addition to platinum: rhodium is good for $NO_x$ reduction while platinum is good for CO and hydrocarbon oxidation. Rhodium is a noble metal found in ores with platinum and other metals but in appreciably lower quantities than platinum. Unfortunately, scarce rhodium has been used in automotive catalysts in greater proportion with respect to the companion platinum than the proportion that it occurs in mined ores. While it would be economically beneficial to reduce the amount of all noble metals required in automotive exhaust gases, a most immediate need is to reduce the requirements for the relatively scarce rhodium component. For this reason, we will illustrate the practice of our invention with examples that employ rhodium.

As stated, rhodium is dispersed in the form of very small particles (along with particles of platinum) on a high surface area alumina in present commercial automotive exhaust treatment catalysts. While palladium and platinum are quite effective for the oxidation of unburned hydrocarbons and carbon monoxide, rhodium is presently much more effective for the reduction of nitrogen oxide. In the environment of automobile exhaust gases, it is realistic to view rhodium as catalyzing the reaction by the CO and NO to form $CO_2$ and nitrogen. In order to study and compare the effectiveness of rhodium on alumina and on two ceria-based carriers of our invention, we prepared a series of rhodium catalysts as follows. A commercial grade of alumina was obtained having a BET area of 70 $cm^2/g$. The alumina was in the form of a powder having a particle size in the range of 80 to 120 mesh. Similarly, pure ceria ($CeO_2$) powder having a BET surface area of 0.3 $cm^2/g$ and 80 to 120 mesh size was obtained. A special binary solid solution of ceria with gadolinia was also made as follows. This material, which we sometimes call activated ceria, also had a BET surface area of 0.3 $cm^2/g$ and an 80 to 120 mesh particle size.

Ceria powder (−325 mesh) and gadolinia ($Gd_2O_3$) powder (−325 mesh) were thoroughly mixed in molar proportions of 89 parts ceria to 11 parts gadolinia. The powdery mixture was heated at 1400° C. in air for 16 hours and then slowly cooled to room temperature in ambient air. The resulting binary solid solution of oxides was crushed, ground and screened to obtain an 80 to 120 mesh particle size fraction. The proportions of gadolinia and ceria were such that the binary mixture crystallized in the fluorite-type cubic lattice of ceria. However, we perceived that the replacement of some of the ceria with gadolinia would introduce defects in this cubical crystal structure that could accommodate additional oxygen.

Catalysts were prepared using the three types of carriers as described below. In general, the practice described in U.S. Pat. No. 4,380,510 was followed so as to deposit the noble metal at the outer surface of each of the carriers.

A dilute solution (0.075 weight percent) of a rhodium salt $[(n-C_4H_9)_4N]_2[Rh(CO)Br_4]_2$ in acetone was prepared. Measured portions of the solution were added to equal volumes of each of the alumina powder, ceria powder and activated ceria powder ($CeO_2$-$Gd_2O_3$) such that each powder received the same amount of rhodium. The rhodium salt was added to the alumina in the amount of 0.09 weight percent rhodium. The ceria powder and activated ceria powder had substantially the same density, which was higher than the density of the alumina powder. Accordingly, the rhodium coating on each of these ceria powders was only 0.04 weight percent in order to compensate for the difference in density.

The acetone impregnated oxides were dried overnight in air at room temperature, heated slowly in flowing air up to 500° C. and then calcined in air at 500° C. for four hours. The rhodium dispersion on each carrier material was confirmed by CO chemisorption assuming 1:1 stoichiometry between a surface rhodium atom and an adsorbed CO molecule. The properties of the three catalysts are summarized in the following table (Table 1).

TABLE 1

CATALYST PROPERTIES

| Catalysts | Rh Loading (wt %) | Total Catalyst Weight (g) | BET Area ($cm^2/g$) | Particle Size (mesh) |
| --- | --- | --- | --- | --- |
| $Rh/Al_2O_3$ | 0.09 | 0.22 | 70 | 80–120 |
| $Rh/CeO_2$ | 0.04 | 0.49 | 0.3 | 80–120 |
| $Rh/CeO_2$—$Gd_2O_3$ | 0.04 | 0.49 | 0.3 | 80–120 |

A catalytic reactor was prepared using a 3.2 mm O.D. stainless steel tube. The depth of the catalyst bed in the tube was 1 cm. The tube was placed in a 30 cm long tubular furnace. Before each experimental run with a catalyst, the reactor containing the catalyst particles was flushed with 1 volume percent carbon monoxide in specially treated oxygen-free helium at 600° C. for half an hour to reduce the catalyst metal. The reactor temperature was then reduced to the desired operating temperature of 500° C. and held at that temperature for one hour with the flow of helium carrier gas containing approximately one part per million of CO. This insured substantially complete desorption of CO as well as elimination of oxygen contamination on the surface of each catalyst before it was tested.

The apparatus was adapted to alternately admit CO and NO into the helium carrier gas, each in the amount of about 800 parts per million based on the helium. The total gas flow rate was 50 $cm^3$/minute at 101 kPa.

The rhodium/alumina catalyst was tested first in the reactor following the above-described catalyst preparation procedure. Cyclic experiments of CO oxidation and NO reduction were carried out at 500° C. by alternately feeding CO and NO to the reactor in the helium carrier gas in the proportions and flow rates described above. In the first experiment, a CO pulse of 10 seconds duration was followed by an NO pulse of 10 seconds duration, which was followed by another CO pulse, and so on. The effluent from the rhodium-alumina reactor outlet was monitored by a mass spectrometer at the reactor outlet.

A study of the recorder output of the mass spectrometer revealed that during each 10 second CO half-cycle, the $Rh/Al_2O_3$ catalyst was active for CO oxidation for about 5 seconds and then the activity disappeared. On the other hand, during each NO half-cycle, the catalyst was active for NO reduction for about 5 seconds and then the reduction activity ceased. These results were observed through repeated NO and CO half cycles. Integration of the mass spectrometer output during testing of the Rh/Al$_2$O$_3$ catalyst showed that the conversion of CO and NO was 76.5 percent. Note that in this experiment the only oxidizing material present was the NO and the only reducing material present was the CO, and so the conversion of one of these materials resulted in the conversion of the other. In fact, the mass spectrometer confirmed the appearance of carbon dioxide and nitrogen in the exhaust gas in exact correlation with the disappearance of CO and NO.

A similar experiment was then carried out using the Rh/CeO$_2$ catalyst. The reactor was sealed and the catalyst was pretreated as described above before the alternating 10 second half-cycle pulses of CO and NO in helium were flowed through the furnace and catalyst bed at 500° C. Integration of the mass spectrometer data with this catalyst showed an 86.5 percent conversion of CO and NO. Thus, the substitution of the ceria carrier for the alumina as a support for the rhodium catalyst produced a substantially higher conversion of CO and NO than the alumina support despite relatively long duration pulses of the oxidizing or reducing medium to the catalyst bed. We view the CO half-cycle as sufficiently similar to a fuel-rich engine operating mode and the NO half-cycle like a fuel-lean engine operating cycle as regards catalyst performance to conclude that the ceria carrier could permit reduction in rhodium content of the catalyst and/or less frequent cycling of the air-fuel supply to the engine.

After evaluating the rhodium-alumina and rhodium ceria catalysts, we conducted the same experiment utilizing the rhodium-ceria-gadolinia catalyst. The CO and NO were pulsed in 10 second half-cycles as described above at 500° C. after suitable pretreatment of the catalyst. In this experiment, mass spectrometer data indicated that 98.2 percent of the CO and NO had been converted to carbon dioxide and nitrogen, respectively. We view this as a very dramatic improvement over the ceria carrier and certainly a very large improvement over the presently used alumina carrier catalyst.

Fresh quantities of the same three rhodium catalysts were then sequentially tested in the reactor using repeated 30 second pulses of the CO and NO. As we expected, the conversions of CO and NO were reduced during these lengthened cycles. We expected a reduction in the conversion because we assumed that oxygen produced by NO reduction would exceed the storage capacity of the respective carriers and accumulate on the noble metal catalyst sides, thus impeding the desired conversion reactions. Indeed, during the 30 second pulse half-cycles of CO and NO, the Rh/Al$_2$O$_3$ provided a conversion of only 50.8 percent of the CO and NO. The Rh/CeO$_2$ catalyst provided a 57.8 percent conversion. However, the Rh/CeO$_2$-Gd$_2$O$_3$ still provided an 82.5 percent conversion of CO and NO. It is to be noted that despite a three-fold lengthening of the CO and NO exposure to the catalyst, our ceriagadolinia carrier catalyst still provided a larger conversion of the CO and NO than did the alumina carrier catalyst during the 10 second half-cycle pulses of CO and NO.

It is apparent that our ceria-trivalent rare earth metal oxide carrier for noble metal catalyst has the capability of successfully converting CO and NO during long cycle variations in engine air-fuel ratio. The carriers are formed by the reaction of ceria with the oxide of a trivalent rare earth metal such as gadolinium, erbium, neodymium, praseodymium, samarium and lanthanum. By combining the tetravalent oxide of cerium with the oxide of a different and trivalent rare earth metal, we believe that the reacted solid solution forms a crystalline material capable of sufficient oxygen storage to accommodate longer exposure of noble metal sites to oxygen. As previously stated, we prefer that our carrier be formed of 85 to 90 molar percent CeO$_2$ and 10 to 15 mole percent of the oxides of one or more trivalent rare earth metals. Suitably, however, carriers may be prepared containing about 5 to 20 mole percent of the trivalent rare earth metal oxides.

Noble metals such as, e.g., platinum and/or palladium and/or rhodium may be dispersed on the carrier by any procedure that deposits the materials in the form of very fine particles. Usually the noble metals are deposited by preparing solutions of their compounds and wetting the carrier with such solutions. Aqueous or nonaqueous solutions may be used. The metals may be deposited sequentially or from the same solution.

While our invention has been described in terms of certain preferred embodiments thereof, it will be appreciated that other forms could readily be adapted by one skilled in the art. Accordingly, the scope of our invention is to be limited only by the following claims.

The embodiments of the invention in which an exclusive property of privilege is claimed are defined as follows 1. A catalyst for treating automotive exhaust gases containing both CO and NO, the catalyst comprising fine particles of noble metal dispersed on carrier particles comprising a crystalline solid solution of 80 to 95 mole percent CeO$_2$ and 5 to 20 mole percent RE$_2$O$_3$ where RE is a rare earth metal, which solid solution is capable of absorbing more oxygen than pure ceria under net oxidizing conditions.

2. A catalyst as in claim 1 in which the noble metal is selected from the group consisting of platinum and rhodium.

3. A catalyst as in claim 1 in which the rare earth constituent comprises gadolinium.

4. A catalyst as in claim 1 in which the carrier particles comprise crystalline solid solution of 85 to 90 mole percent CeO$_2$ and 10 to 15 mole percent RE$_2$O$_3$, which solid solution is capable of absorbing more oxygen than pure ceria under net oxidizing conditions.

5. In the method of treating the exhaust gas from a hydrocarbon-fueled internal combustion engine comprising continually cycling the air-fuel mixture supplied to the engine between a fuel-rich condition and a fuel-lean condition while contacting the exhaust gas with a catalyst comprising one or more noble metals dispersed on ceramic carrier particles, the improvement in which the carrier particles comprise a crystalline solid solution of 80 to 95 mole percent CeO$_2$ and 5 to 20 mole percent RE$_2$O$_3$ where RE is a rare earth metal, which solid solution is capable of absorbing more oxygen than pure ceria under net oxidizing conditions.

6. In the method of treating the exhaust gas from a hydrocarbon fueled internal combustion engine comprising continually cycling the air-fuel mixture supplied to the engine between a fuel rich condition and a fuel lean condition while contacting the exhaust gas with a catalyst comprising one or more noble metals selected from the group consisting of rhodium, platinum, and palladium, dispersed on ceramic carrier particles, the improvement in which the carrier particles comprise a crystalline solid solution of 80 to 95 mole percent CeO$_2$ and 5 to 20 mole percent $RE_2O_3$ where RE is a rare earth metal taken from the group consisting of gadolinium, erbium, neodymium, praseodymium, samarium, and lanthanum, which solid solution is capable of absorbing more oxygen than pure ceria under next oxidizing conditions.

7. A method of treating the exhaust gas from a hydrocarbon-fueled internal combustion engine comprising continually cycling the air-fuel mixture supplied to the engine between a fuel-rich condition and a fuel-lean condition while contacting the exhaust gas with a catalyst comprising rhodium and optionally one or more noble metals selected from the group consisting of platinum and palladium dispersed on ceramic carrier particles, the carrier particles comprising a crystalline solid solution of 80 to 95 mole percent $CeO_2$ and 5 to 20 mole percent $Gd_2O_3$, which solid solution is capable of absorbing more oxygen than pure ceria under next oxidizing conditions.

* * * * *